Dec. 13, 1938.  J. H. BANE  2,139,927
SICKLE HEADER FOR HARVESTERS AND THE LIKE
Filed May 14, 1937  4 Sheets-Sheet 1
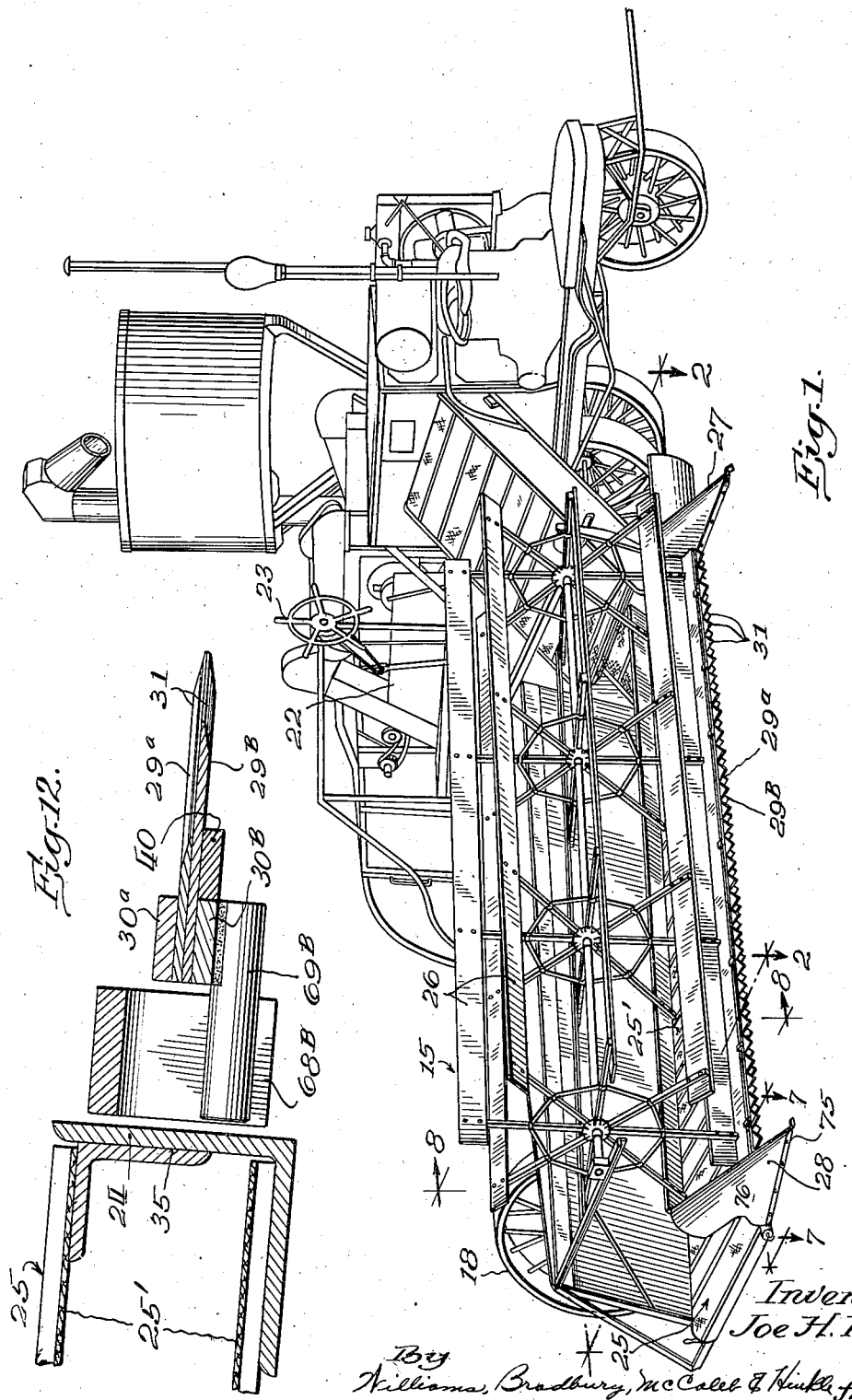

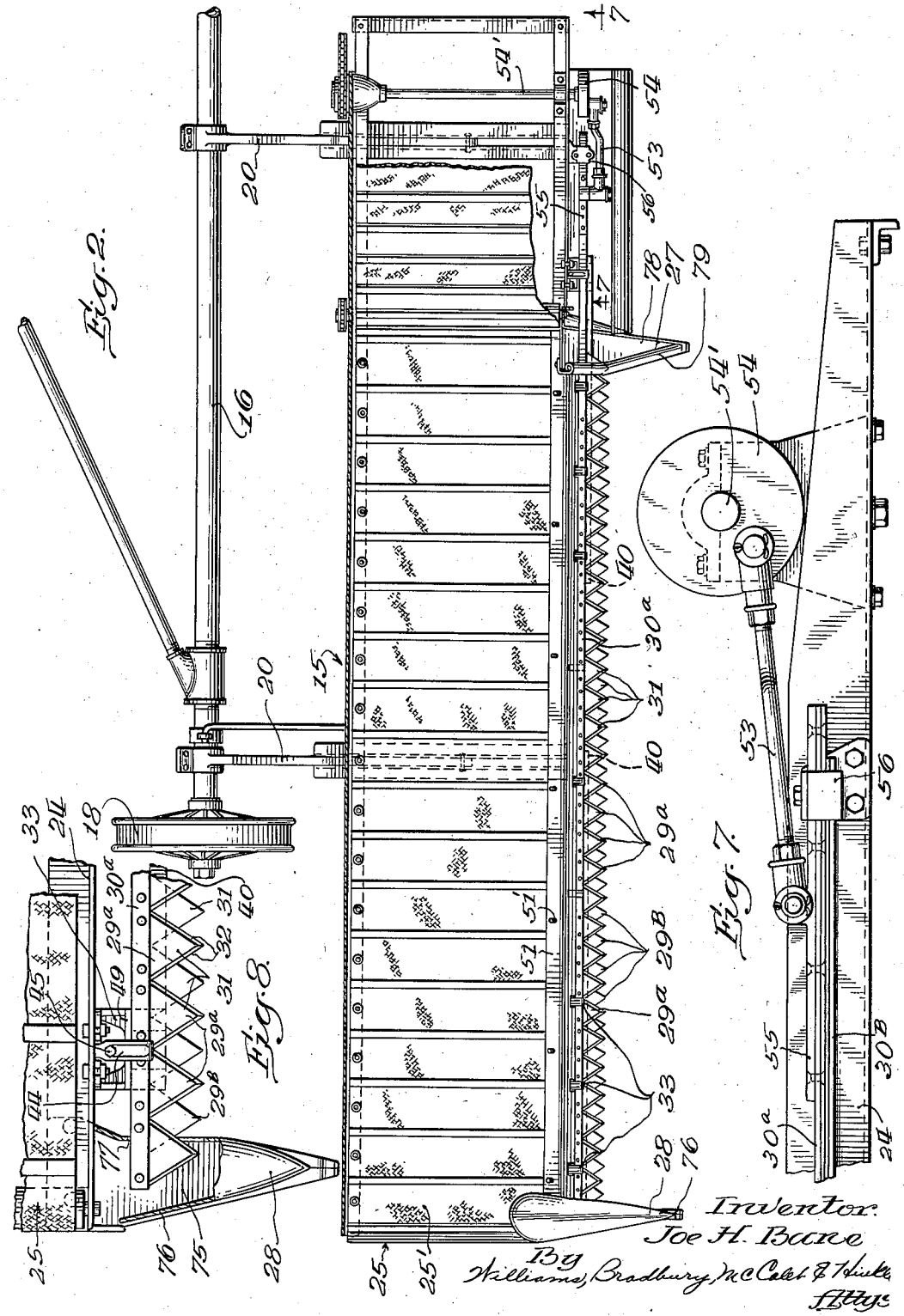

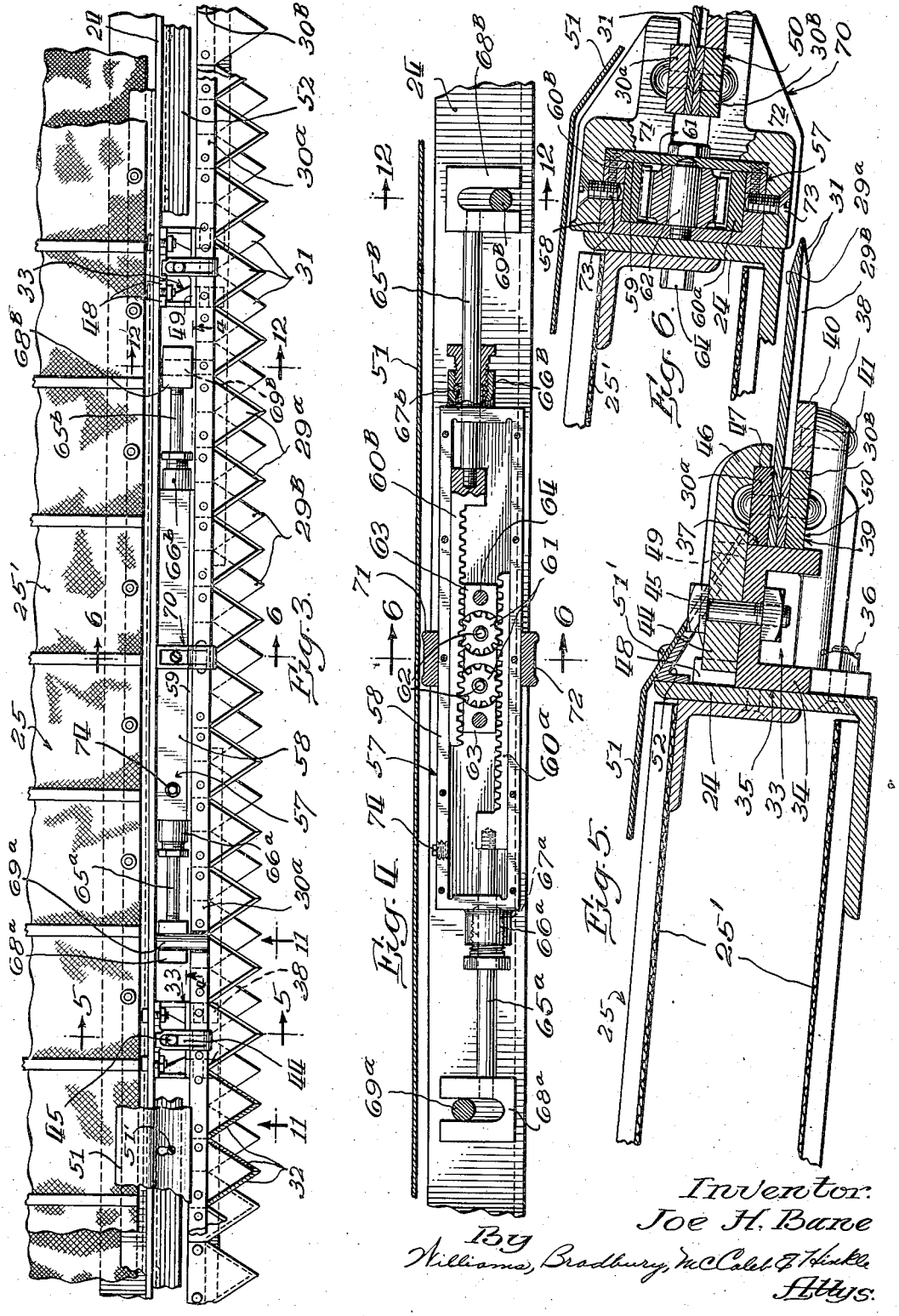

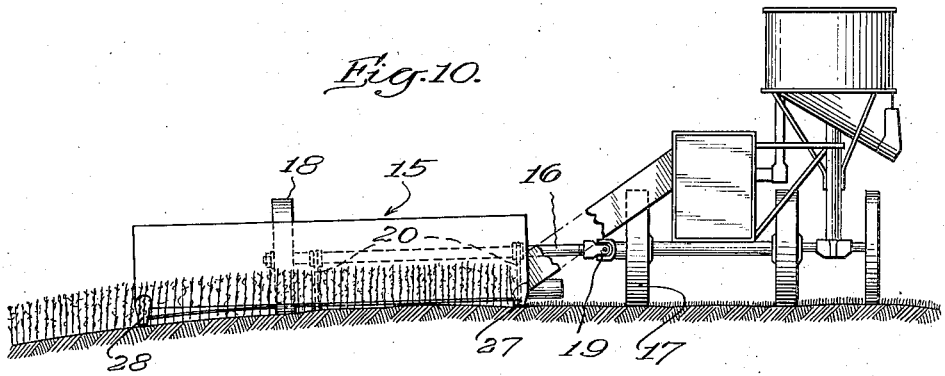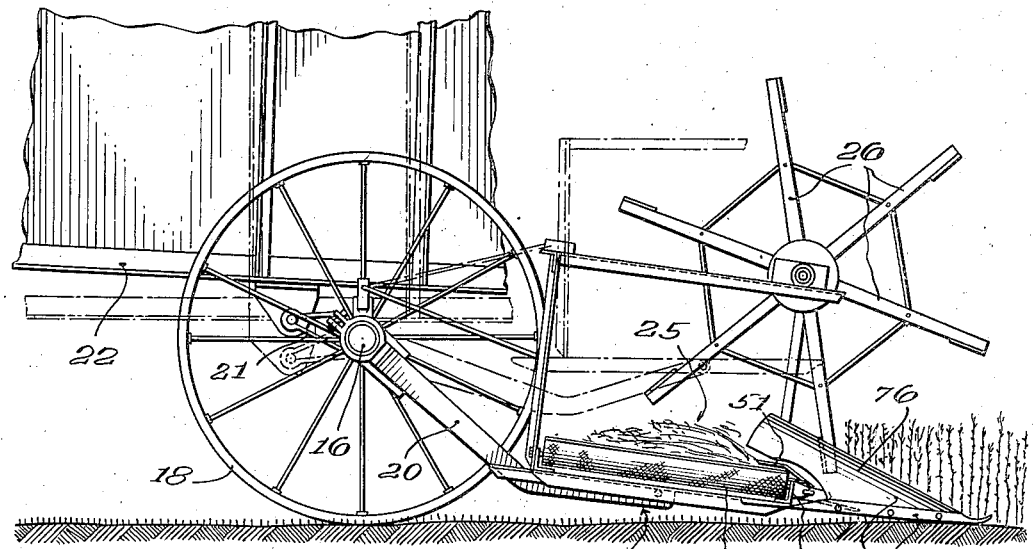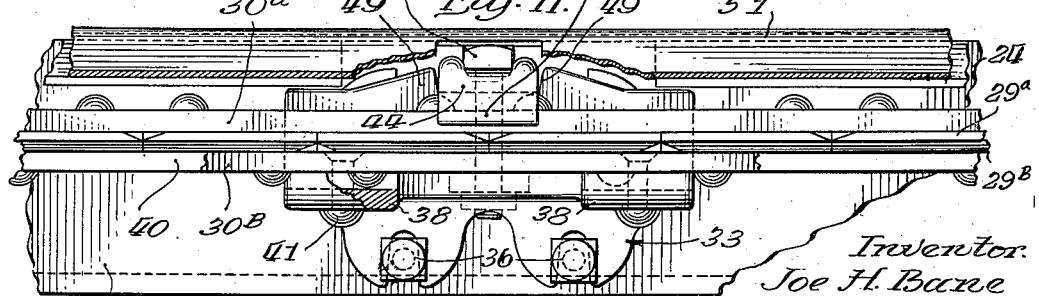

Patented Dec. 13, 1938

2,139,927

UNITED STATES PATENT OFFICE 2,139,927

SICKLE HEADER FOR HARVESTERS AND THE LIKE

Joe H. Bane, Dana, Ill.

Application May 14, 1937, Serial No. 142,524

15 Claims. (Cl. 56—158)

My invention relates to sickle headers for harvesters and the like, and more especially to the structure, mounting, drive and operation of sickle bars in the headers of harvesters and like machines, such as mowers, combines, and the like, better adapted for close cutting of vine-like crops, such as soy bean plants, which clog, and are difficultly cut by, the conventional sickle headers of such machines.

The sickle mechanism as incorporated in the conventional headers of these machines, when applied to the cutting of soy bean plants, has been found to clog and to cut much more slowly than when applied to cutting grains. My observations have led me to believe that this partial failure of sickle mechanisms now in use is for the following reasons: Because the stems do not uniformly grow vertically, but are often inclined to spread out vine-like and because the pods start rather close to the ground, it is necessary that the sickle bar be operated much closer to the ground than in the cutting of grains.

When the stems are engaged by the sickle bar so close to the ground, the stems to be cut are relatively large in diameter, they often extend obliquely, and are too close to their anchorage in the ground to afford the degree of lateral flexing which can be relied upon in cutting ordinary grains higher above the ground. The forwardly pointing finger-like guards, which fixedly carry the ledger plates, themselves being stationary with the header, do not move transversely as the header is drawn forwardly. The anchorage of the stems in the ground likewise holds the stems, at least at the low elevation of the cutting, against substantial lateral movement as the header passes forwardly. As a consequence, there is no relative lateral movement between the guard fingers, ledger plates and stems, as the header is drawn forwardly, except such movement as may result by sheer force of the camming action of the pointed guard fingers. The whole burden of the cutting is thus thrown upon the oblique cutting edges of the reciprocating sickle blades. These reciprocating oblique edges can only with difficulty sever the stems without the aid of a complementary shear edge. Because this complementary shear edge—the slightly tapered edges of the ledger plates—does not reciprocate transversely this means that the reciprocating oblique edge of the shear bar in general has to shift the stem laterally a considerable distance to bring it into shearing position. This takes considerably greater force for the sickle mechanism, and it results in the stems being forced into very oblique positions (because the reciprocating blades engage the stem so close to the ground), and as a result the cutting operation is slowed down very considerably and the stems, because so many of them are so obliquely deflected laterally, entangle themselves to a considerable extent with the guards. The degree of lateral inclination of many of the stems brings them too low properly to be engaged by the bats of the reel, and in consequence the accumulation of stems and other vine-like entanglement with the guards further slows down the cutting operation and requires frequent cleaning out. This situation is particularly acute at the edges of the path being mowed, where the plants also clog against the inside and outside dividers.

I have solved this problem by making both sickles reciprocable and relatively flexible, and providing a reversing mechanism whereby the two sickles are simultaneously shifted in opposite directions. I eliminate the stiffening action of the guards.

The sickle driving action is such that in every half cycle the upper sickle is moved laterally a distance the same as the distance between two sickle points, while the lower sickle is moved in the opposite direction a similar distance. This has many advantages calculated to speed up and render more effective the cutting operation. A given stem never has to be shifted laterally more than one-half of a tooth space, and most stems fall in such a position that they require much less shifting. The valley of the cooperating shear edges never shifts laterally, as it does when the stationary ledger plates are used. Because of this, there is still less tendency to shift the stems laterally, and therefore they are more inclined to remain upright and less inclined to tangle in the sickle. Considering a given path in growing plants extending parallel with the direction of movement of the machine and of a width the same as the distance between sickle points, that path is subjected to six shearing actions for each cycle of the sickles.

Let us assume that at the start of the cycle the points of the upper and lower sickles are in register and that adjacent points come at the lateral margins of the given path to be analyzed. During the first quarter of the cycle the upper and lower sickle bars will be shifted in opposite directions until points again come in register. During that quarter cycle the width of the path will have been subjected to one complete shearing action. Relative to the stationary path, each sickle will have been shifted laterally one-half the width of the path, and the then registering points will come at the median line of the path. In the shearing action to which the path is subjected during the first quarter of the cycle, the valley of the cooperating shearing edges will shift forwardly along the medial line of the path.

During the second quarter of the cycle each sickle will continue to shift laterally in the same direction in which it is shifted during the first cycle. At the start of the second quarter of the cycle, the registering points of the upper and lower sickles will be on the center line of the path and the adjacent valleys will be on the lateral edges of the path.

During the second quarter of the cycle, two shearing actions will take place within the path, with the valleys of the two shearings following the respective lateral edges of the path and progressing forwardly (relative to the sickles) until sickle points again come in register at the lateral edges of the path. During this second cycle the left-hand half of the path is subjected to one shearing action and the right-hand half is subjected to another shearing action, so that the entire width of the path is again sheared in the second quarter of the cycle.

The third quarter of the cycle is a reversal of the first quarter, and the fourth quarter is a reversal of the second quarter. This makes, in all, six shearing actions in the given path for each cycle, and these six shearing actions consist of two which traverse the entire width of the path, and four, each of which traverses one-half of the width of the path.

It will thus be seen that with my sickle arrangement, during each cycle of the sickle-operating pitman, the full width of any given path is subjected to four, instead of two, complete shearing actions; there is much less tendency for the stems to be bent laterally because they are subjected to practically no shifting because the valleys of the cooperating shear edges do not shift laterally; the plants are engaged only by elements which are shifting laterally relative to the plants, and therefore shake the plants loose from them, whereas the stationary ledger plates and guard fingers of the conventional harvester do not shift relative to the plants; and, because the sickles are left relatively flexible because they are not stiffened by the rigid guards, the sickles are given a degree of flexibility which makes it easier for them to free themselves from the vine-like plants and to overcome any clogging between the mating surfaces of the sickles. As a result, a harvester incorporating my sickle arrangement may be drawn at a fairly rapid rate across the soy bean field and yet effectively cut the plants close to the ground and without objectionable clogging.

Another and closely allied phase of my invention is the positioning of the adjacent wall of the divider in reference to the blades of the cooperating reversely driven sickles whereby it is insured that any plant stem guided along the wall of the divider will be shorn between cooperating blade edges of the sickles, as distinguished from an attempt to shear the stem merely between the wall and one of the blades.

The flexibility given my sickle arrangement not only aids in avoiding clogging and helps free the plants from entanglement with the sickle, but it gives the forward or sickle edge of the header a degree of flexibility which permits it better to follow the contours of the ground and, when encountering field stones, for example, to flex locally to clear them without damage to the sickles.

Another important feature of my invention is the reversing mechanism whereby the reciprocating movement imparted to one sickle by the pitman is reversed and applied centrally to the other sickle. This reversing mechanism, although centrally arranged, is so designed that its overall height does not enlarge the normal thickness of the platform at its forward edge, does not interfere with plants passing onto the platform, and permits flexure of the sickles.

The foregoing, together with further objects, features, and advantages of my invention are set forth in the following description of a specific embodiment thereof, as illustrated in the accompanying drawings, wherein Fig. 1 is a front perspective view of an otherwise conventional combine or harvester-thresher in which my invention has been incorporated;

Fig. 2 is a plan view of the header of the combine;

Fig. 3 is a detail plan view of a portion of the sickle and adjacent parts, with the shield broken away to reveal underlying parts;

Fig. 4 is a vertical section, looking rearwardly, and taken on the line 4—4 of Fig. 3, along the medial line of the reversing mechanism;

Fig. 5 is a transverse section through the sickles at one of the spaced bearing brackets, taken on the line 5—5 of Fig. 3;

Fig. 6 is a similar transverse section taken on the line 6—6 of Fig. 3, at the mid point of the reversing mechanism;

Fig. 7 is a front elevation of the pitman and associated parts, taken on the line 7—7 of Fig. 2;

Fig. 8 is a detail plan view of the outer end of the forward edge of the header, with a portion of the outside divider broken away;

Fig. 9 is a side elevation looking toward the outer end of the header;

Fig. 10 is a somewhat diagrammatic front view of the combine, illustrating the flexure of the sickles;

Fig. 11 is a detail front elevation of one of the bearing brackets, which may be considered as taken on the line 11—11 of Fig. 3; and Fig. 12 is a detail section taken on the line 12—12 of Fig. 4 and transversely of the reciprocating mechanism.

The Case type of combine, which has here been arbitrarily selected as illustrative of an embodiment of my invention, comprises a header 15 mounted on a main header axle 16, which in turn is supported by an inside wheel 17 and a grain wheel 18, the main axle having a universal joint 19, which permits the header to swing up or down, according to the contour of the field.

The header is supported by header arms 20 fixed on the main shaft and counter-balanced through short arms 21 by the weight of the thresher 22. The header, as mounted on the arms 20, is raised and lowered about the main header axle 16 by manipulation of a tiller wheel 23.

An angle bar 24 constitutes the forward portion of the header frame and supports the sickles as well as the forward portion of the platform 25 on which the platform canvas 25' travels.

The usual reel 26 operates above the sickles and within the path defined by the inside divider 27 and the outside divider 28.

The sickles themselves comprise a pair of superimposed sickles, each of which, for convenience, may be identical with the reciprocating sickle used in the conventional harvester.

The upper sickle 29A comprises a backing strip 30A, on the under side of which the sickle forming blades 31 are riveted in lateral abutment. That portion of each blade which extends forwardly of the backing strip is in the form of an isosceles triangle, having serrated shearing edges 32. The lower sickle 29B may be identical with the upper sickle 29A, but it is so mounted that its backing strip 30B comes on its under-side.

The sickles are preferably not mounted in a continuous way, because that would interfere with the flexibility I prefer to secure for the sickles. Instead, the sickles are reciprocably journaled in a series of short, widely spaced brackets 33. Each bearing bracket is formed in part by a lower member 34, having a vertical rear face 35, which abuts the forward face of the angle bar 24 and is attached thereto by bolts 36. The lower bracket member 34 also includes a forward face 37 which abuts the rear edges of both the upper and lower sickles. It carries bifurcated forward extensions 38 which have upper faces 39 adjacent the face 37 for sliding abutment with the lower face of the backing strip 30B. At their forward ends the extensions 38 carry a forward way strip 40 secured to the extensions by rivets 41. The rearward edge of the strip 40 is in slidable contact with the forward edge of the backing strip 30B, while the upper face of the strip 40 is in slidable contact with the bottom face of the lower sickle blades.

The strip 40 may be localized only at the extensions, or it may bridge the distance between the pair of extensions. Preferably, however, the strip 40 is considerably longer than that and extends far enough to be supported by a plurality of bearing brackets, as indicated in Fig. 3. However, the strip 40 is preferably not a continuous strip extending the full length of the sickles, but, instead, is in interrupted sections whereby it does not substantially impair the flexibility of the sickles.

The upper member 44 of each sickle-bearing bracket 33 rests upon the upper face of the lower member, and is secured thereto by an attaching bolt 45. It continues forwardly into a guiding finger portion 46, the under side of which presents a face for sliding contact with the top face of the backing strip 30A and a rearwardly facing shoulder 47 for sliding against the forward edge of the backing strip 30A. The upper bracket member 44 is held against turning about its attaching bolt, relative to the lower member, by rearward and forward pairs of spaced abutments 48 and 49 cast into the top of the lower member 34.

It will thus be seen that the various faces and shoulders of the upper and lower members of the sickle bearing bracket 33 constitute a way 50 for slidably receiving the upper and lower sickles. The upper and lower surfaces of the way are grooved, as shown, to provide clearance for the rivets which hold the sickle blades to their backing strips. The sickles are free to reciprocate in the way 50 simultaneously in opposite directions, with their opposed faces in contact to provide the necessary shearing action of their inclined blade edges. This way 50, however, is not continuous, but is of relatively short sections interrupted by relatively wide gaps.

This has numerous advantages. One is that sand and dirt will more readily work out of the short bearing sections. Another reason is that the structure forming the way does not tend to stiffen the sickle, but permits the sickles to flex better to follow the contour of the field, as indicated diagrammatically in Fig. 10. The wide gap between the narrow sections of the way permits local flexure of the sickles better to permit their flexing in riding over field stones and small obstacles encountered in the field. Were it not for this localized flexure, a field stone would be subjected to the entire weight of the header, with the result that the blades would be severely damaged. The wide gaps between the short sections of the way also permit of some flexure, at the region of the gaps, as between the upper and lower sickles, so that they may momentarily be separated by flexure or tipping sufficient to clear any foreign matter, such as stray pieces of fence wire, which might otherwise break or seriously nick or permanently clog the blades.

For guiding the cut plants up onto the traveling platform canvas 25' and over the gap between the forward angle bar 24 of the platform frame and the sickles and over the reversing mechanism which is positioned in that gap, I provide a shield 51 of sheet metal, which extends the entire length of the sickles between the inside and outside dividers 27 and 28. The shield 51 is removably attached by means of cap screws 51, working through key-hole shaped slots in the shield, to a shield bracket 52 of angular cross section mounted along the upper forward edge of the angle bar 24. The shield 51, as well as the shield bracket 52, are slotted at intervals along their forward edges to clear the upper members 44 of the sickle bearing brackets 33.

The upper sicklet 29A may be reciprocated by any conventional reciprocating mechanism, such as the usual pitman operating on one end thereof. As here shown, the pitman 53 is driven by an eccentric or crank 54 on a driven pitman shaft 54'. The outside end of the pitman is pivotally connected to the backing strip 30A of the upper sickle by means of a bracket 55 fixed at the inner end thereof, as shown in Fig. 7. A bearing bracket 56 is preferably provided for the inner ends of the sickles and the pitman bracket 55.

A reversing mechanism, indicated generally at 57 (Fig. 3) is provided for taking the reciprocating motion imparted to the upper sickle and reversing it to reciprocate the lower sickle simultaneously, but in the opposite direction. Preferably the pitman reciprocates each sickle through a distance which is the same as the distance between points of the blades. The lower sickle is preferably so arranged in reference to the upper sickle that the points of the two sickles register at the ends of the strokes.

The reversing mechanism 57 comprises an elongated housing 58 disposed centrally of the header and in the gap between the sickles and the angle bar 24. The housing 58 is box-like, with a channel-shaped cross section, with the open side facing forwardly and closed by a cover plate 59 (see Figs. 4 and 6).

The upper and lower gear racks 60A and 60B are slidably mounted within and longitudinally of the housing 58. The racks are engaged by an intervening reversing gear—or preferably, as here shown, by a pair of spaced gears 61. The reversing gears 61 are journaled on shafts 62 fixed in the housing.

Preferably spacing blocks 63, cast integrally with the housing and extending forwardly from the back thereof, are provided between the toothed faces of the racks and between, and on each side of, the gears 61 to form a further guide-way for the racks. Mounting bolts 64 extend through the cover plate, the outer blocks 63, and the back wall of the housing, for mounting the housing against the forward face of the angle bar 24 of the platform frame.

The upper and lower racks 60A and 60B carry extension rods 65A and 65B, which pass out through bearings 66A and 66B in the respective ends of the housing, passing through packings 67A and 67B to prevent loss of lubricant from the housing.

The outer ends of the rods 65A and 65B carry slotted blocks 68A and 68B, respectively. A drive pin 69A is secured, as by welding, to the top side of the backing strip 30A of the upper sickle, and the pin extends into the slot of the block 68A. Similarly, a drive pin 69B is mounted on the under side of the backing strip 30B of the lower sickle, and extends rearwardly into the slot of the block 68B.

The reciprocating motion given the upper sickle by the pitman 58 is imparted by the drive pin 69A to the block 68A, and in turn to the rack 60A, and this motion is reversed by the gears 61 and oppositely imparted through the racks 60B, block 68B, and drive pin 69B to the lower sickle, whereby the two sickles reciprocate simultaneously, but in opposite directions.

The reason I use slots instead of round holes for the drive pins in the blocks 68A and 68B is to accommodate upward or downward flexure of the sickles without impairing the positive and uniform action of the reversing mechanism.

Because the overall length of the reversing mechanism is greater than the gap I prefer to leave between bearings for the sickles, but the reversing mechanism would interfere with the placement of a sickle-bearing bracket of the type shown at 33, I employ a special sickle-bearing bracket 70 at the midpoint of the reversing mechanism. This comprises upper and lower members 71 and 72 partially embracing the housing 58, and secured to its top and bottom walls, respectively, by screws 73. The upper and lower bearing bracket members 71 and 72 present surfaces constituting the way 50, as do the brackets 33, as best shown by a comparison of Figs. 5 and 6.

The upper wall of the housing 58 carries a screw plug 74, whereby the interior of the housing may be filled with lubricant from time to time.

The outside divider 28 (see Figs. 1, 8 and 9) comprises a forwardly tapered shoe 75 with an upwardly turned toe and a top sheet 76 of sheet metal rolled into a semi-conical shape and secured at its bottom edges to the shoe, and contoured at its lower rearward edges as indicated in Fig. 9, to clear the platform. The inside lateral wall of the divider is slotted as indicated at 77 in Fig. 8, to receive the ends of the sickles which extend into the hollow interior of the divider.

Somewhat similarly the inside divider 27 comprises a shoe 78 and a side wall 79, as shown in Figs. 1 and 2. The side wall, however, is only on the grain side, and may consist of a vertical sheet secured to the shoe 78 at its bottom edge and beaded over at its upper inclined edge, as shown. A wall may be omitted at the other or inner side of the divider because its function is served by the usual deflector or guard for the pitman mechanism which rides over the stubble.

Particular attention is called to the position of the sickle side walls of the dividers in relation to the reciprocable positions of the oppositely moving blades of the upper and lower sickles. As previously explained, because the blades of the upper and lower sickles are equally spaced, and because they reciprocate simultaneously in opposite directions, the valleys of the V's formed by the cooperating shearing surfaces do not shift laterally of the direction of pull of the header. Instead, the valleys travel in parallel lines which do not shift in reference to the header. The lateral walls of the dividers on the sides which come adjacent the plants being cut are so positioned that they pass along the center line of one of these non-shifting V's, as best shown in Fig. 8. Although the side walls diverge somewhat, they still maintain substantially this relationship, especially at the region of the slot 77 adjacent the sickles.

As a result of this relationship between the divider and sickles, any plant stem which fall adjacent the divider wall facing the plants being cut, will ride against the wall, but the cooperating shearing surfaces of the upper and lower sickle bars which form the V at any moment, along whose center line the wall is disposed, will be shorn by these two co-operating shearing edges of the sickles. It will not force the wall to act as one shearing member in an attempt to cooperate with a shearing edge of one of the sickle blades. It is the latter complication which has previously been a serious source of jamming and clogging. By my invention it is avoided.

When the sickles come into the relative position of Fig. 8, where the points of the lower sickle are half way between the points of the upper sickle, the sickles may be considered as having just completed either the first or third quarter of the cycle of reciprocation. The V's between cooperating shearing edges will either be getting deeper or shallower, but, whether they are getting deeper or shallower, the valley of the V which comes along the wall of the divider will travel in and out along the wall so that any stem sliding along the wall will come into the valley of a V between cooperating shearing edges of the sickles and be sheared thereby. Were it not for this relationship, stems sliding along that wall of the divider would come into a position where one of the blades would attempt to shear the stem against the wall of the divider, and the wall would not be in proper shearing cooperation with the blade; it would be too far above or below the blade. In consequence, such a stem would not be shorn and, instead, would clog the sickles, and other stems similarly received would build up an accumulation which would soon require that the harvester be stopped for cleaning out the divider corners.

I have described the margin of the divider as passing substantially along the center line of the shear V, that is, substantially along the path of the apex or intersection of cooperating blade edges. The optimum relationship is where the margin of the divider passes along a line spaced outwardly from this center line or blade intersection path by a distance equal to half the diameter of the stems being cut. This better insures that the blade edge emerging from the divider slot 77 will engage the stem in the apex of the shearing V, rather than being held from it by the margin of the divider. Such offset from the exact center line, however, is too small to cause perceptible clogging, when the points are in register, of a stem encountered between the margin and a pair of registered points.

While I have thus described one specific embodiment of my invention as incorporated in a specific type of harvester, I contemplate that many changes and substitutions may be made without departing from the scope of spirit of my invention and that my invention has varying application to other types of harvesters, combines, mowers and the like, and that it may be used for other crops than soy beans where similar problems are encountered.

I claim:

1. A harvester header comprising a pair of superimposed sickles, each having similarly spaced forwardly pointed blades with diverging shearing edges, means for slidably mounting the sickles for shearing cooperation of their respective blades, drive means for reciprocating the sickles simultaneously in opposite directions, whereby the cooperating shearing edges describe enlarging and contracting V's, an outer divider at the outer end of the sickles, comprising a shoe extending forwardly substantially in the plane of the sickles, and a generally semi-conical shell mounted on the shoe at the upper side thereof and with the shoe constituting a hollow divider, the ends of the sickles extending into the hollow interior of the divider, and the inside margin of the divider extending rearwardly past the region of the sickles along a line substantially at the center line of one of the V's.

2. A header for a harvester or the like comprising a pair of superposed sickles having cooperating shear edges, at least some of which are angularly disposed, drive means for relatively reciprocating them, and a divider extending forwardly of the sickles and having a stem guiding margin facing the cutting path of the sickles positioned to approach the sickles along a line laterally spaced, by a distance in the order of the average radius of the stems being cut, short of the path of the intersection of a pair of cooperating shear edges.

3. A header for a harvester or the like comprising a platform having a front frame, a pair of cooperating sickles positioned forwardly of the front frame, bearing means for mounting the sickles for reciprocation of both sickles relative to each other and to the front frame comprising widely spaced apart brackets mounted at intervals upon the front frame and extending forwardly therefrom, constituting an interrupted way for the sickles, and means for simultaneously reciprocating the sickles in opposite directions, the sickles being free to flex together vertically between the brackets.

4. A header for a harvester or the like comprising a platform having a front frame, a pair of cooperating sickles positioned forwardly of the front frame, bearing means for mounting the sickles for reciprocation of both sickles relative to each other and to the front frame comprising widely spaced bearing brackets mounted at intervals upon the front frame and extending forwardly therefrom, constituting an interrupted way for the sickles, and means for simultaneously reciprocating the sickles in opposite directions, the sickles being free to flex apart intermediate the brackets.

5. A header for a harvester or the like comprising a platform, a frame member along the forward edge of the platform, a pair of superposed sickles, bearing means for mounting the sickles a spaced distance forwardly of the frame member for reciprocation of the sickles relative to each other and to the platform, the bearing means comprising widely spaced brackets secured at intervals to the frame member and extending forwardly therefrom, the brackets presenting short ways for slidably mounting the sickles with wide gaps therebetween, and the brackets constituting the sole support for the sickles against vertical flexing intermediate their ends, and means for simultaneously reciprocating the two sickles in opposite directions.

6. A header for a harvester or the like comprising a forward frame member extending along the width of the header, bearing brackets disposed at widely spaced intervals along the forward frame and constituting short normally aligned ways, a pair of cooperating sickles slidably mounted in the ways, each sickle comprising a blade portion and a backing strip portion, and means for longitudinally reciprocating the sickles, the widely spaced ways constituting the sole support, as against vertical flexure, for the sickles intermediate their ends.

7. A header for a harvester or the like comprising two substantially identical sickles, each comprising a backing strip and a set of separate blades individually attached to the strip and having forwardly pointed triangular portions extending forwardly of the backing strip and carrying oblique shearing edges, with the bases of the triangular portions in lateral abutment upon the backing strip, the sickles being superposed with their blade faces in contact and their strips opposed, means for mounting the sickles for longitudinal reciprocation for shearing cooperation of their respective blade edges, and rack and pinion means for reciprocating the two sickles simultaneously but in opposite directions.

8. A header for a harvester or the like comprising a frame extending longitudinally of the header, a pair of superposed sickles extending longitudinally of the header and forwardly of the frame, means carried by the frame for slidably mounting the sickles for shearing cooperation, a pitman pivotally connected to the inside end of one of the sickles for reciprocating it, a rack and pinion reversing mechanism disposed at a mid point of the sickles, for receiving from the one sickle the reciprocatory motion imparted to it by the pitman, reversing it, and applying the reversed motion to the other sickle, whereby the two sickles reciprocate simultaneously but in opposite directions.

9. A header for a harvester or the like comprising a platform having a frame, a pair of superposed sickles extending longitudinally of the frame and forwardly of the platform, means carried by the frame for slidably mounting the sickles for shearing cooperation, a pitman pivotally connected to the inside end of one of the sickles for reciprocating it, a rack and pinion reversing mechanism disposed at a mid point of the sickles, for receiving from the one sickle the reciprocatory motion imparted to it by the pitman, reversing it, and applying the reversed motion to the other sickle, whereby the two sickles reciprocate simultaneously but in opposite directions.

10. A header for a harvester or the like comprising a frame, a pair of sickles, means carried by the frame for slidably supporting the sickles to permit their vertical flexure, drive means connected to an end of one of the sickles for reciprocating it, and a reversing mechanism, and means connecting the reversing mechanism to each of the two sickles for reversing the reciprocating motion imparted to the one sickle and applying the reverse motion to the other sickle, whereby the two sickles reciprocate simultaneously but in opposite directions, said connecting means permitting the vertical flexure of the sickles.

11. A header for a harvester or the like comprising a pair of sickles, means for slidably mounting the sickles in superposed relation for reciprocation of both, drive means for reciprocating one of the sickles and a reversing mechanism for reciprocating the other sickle simultaneously but in the opposite direction, comprising a pair of vertically superposed racks, a reversing pinion operatively intervening between the racks, and means connecting the ends of the racks to the respective sickles, each of said connecting means comprising a vertically slotted member and a pin member working therein, one of said members being carried by the rack and the other being carried by one of the sickles.

12. A header for a harvester or the like comprising a pair of sickles, means for slidably mounting the sickles in superposed relation for reciprocation of both, drive means for reciprocating one of the sickles and a reversing mechanism for reciprocating the other sickle simultaneously but in the opposite direction, the reciprocating mechanism comprising a housing, a pair of racks oppositely disposed in parallel but vertically spaced relation, a reversing pinion operatively intervening between the racks, rod portions carried at the outer end of each rack and protruding outwardly through the adjacent end of the housing, and means forming a vertical slot carried at each protruding end of the rod portions, a rearwardly protruding pin carried on each sickle and entering one of the slots, whereby the sickles may flex vertically.

13. A header for a harvester or the like comprising a platform frame, a pair of sickles, means for slidably mounting the sickles for longitudinal reciprocation a spaced distance forwardly of the frame, drive means connected with an end of one of the sickles for reciprocating it, and a reversing mechanism operated by the driven sickle for reversing the motion imparted thereto and imparting the reverse motion to the other sickle whereby the two sickles are simultaneously reciprocated in opposite directions, the reversing mechanism being interposed in the space between the sickles and the frame and comprising a housing carried by the frame, opposed racks slidably journaled in the housing, a reversing pinion operatively intervening between the racks, opposed ends of the respective racks carrying extension portions protruding outwardly of the housing, and connecting means on the sickles and on the protruding portions of the racks.

14. A header for a harvester or the like comprising a frame member extending along the forward edge of the header, a pair of sickles, each comprising a backing strip and blades secured thereto, the sickles being disposed in superposed relation with the faces of their blades in contact and their backing strips on opposite sides, and means for slidably mounting the sickles comprising bearing brackets disposed at spaced intervals along the frame member and extending forwardly therefrom, and means for reciprocating the sickles in opposite directions, each bearing bracket comprising a lower member having a vertical face lying against a vertical face of the frame member, a bolt for attaching the lower member to the frame member, a forward face for slidably engaging the rearward faces of the sickles, an upward face for slidably engaging the bottom side of the backing strip of the lower sickle and a rearward face for slidably engaging the forward edge of the backing strip of the lower sickle, and an upper bracket member bolted to the lower member and comprising a portion engaging an upper surface of the lower member, a downward face for slidably engaging the top side of the backing strip for the upper sickle and a rearward face for slidably engaging the forward edge of the backing strip for the upper sickle.

15. A header for a harvester or the like comprising a frame member extending along the forward edge of the header, a pair of sickles, each comprising a backing strip and blades secured thereto, the sickles being disposed in superposed relation, with the faces of their blades in contact and their backing strips on opposite sides, and means for slidably mounting the sickles comprising bearing brackets disposed at spaced intervals along the frame member and extending forwardly therefrom, and means for reciprocating the sickles in opposite directions, each bearing bracket comprising a lower member bolted to a forward face of the frame member and having a downwardly opened channel-shaped portion, one flange of which lies against the forward face of the frame member, and the other flange of which presents a forward face for slidably contacting the rear edges of the sickles, the lower member including a pair of laterally spaced forward extensions carrying a rearward face for engaging the forward edge of the backing strip for the lower blade and an upper face for slidably engaging the under face of the blade of the lower sickle, and an upper bracket member bolted to and resting upon the web of said channel shaped portion and extending forwardly for slidably engaging the top side and forward edge of the backing strip for the upper sickle.

JOE H. BANE.